United States Patent

Noshimura et al.

[11] 4,219,441
[45] Aug. 26, 1980

[54] AQUEOUS ALKALI OR ALKALINE TREAT AND HEAT REGENERATION OF $NH_4^+$ ADSORBED ZEOLITE OR ZEOLITE-CARBON USED TO TREAT WASTE WATER

[75] Inventors: Yusaku Noshimura; Yasuo Koseki; Masayoshi Kubota, all of Hitachi; Shoji Kubota, Katsuta; Sankichi Takahashi, Hitachi, all of Japan

[73] Assignee: Hitachi, Ltd., Tokyo, Japan

[21] Appl. No.: 855,702

[22] Filed: Nov. 29, 1977

[30] Foreign Application Priority Data

Dec. 1, 1976 [JP] Japan .............................. 51-143402
Jan. 5, 1977 [JP] Japan .............................. 52-113
Jan. 14, 1977 [JP] Japan .............................. 52-2415

[51] Int. Cl.² .................. B01J 29/38; B01J 21/20; B01D 15/06; B01J 1/09
[52] U.S. Cl. .......................... 252/412; 210/32; 210/38 R; 210/40; 252/411 R
[58] Field of Search .......... 252/412, 420; 210/38 R, 210/39, 40, 32

[56] References Cited

U.S. PATENT DOCUMENTS

| | | | |
|---|---|---|---|
| 1,074,337 | 9/1913 | Wijnberg | 252/412 |
| 1,189,896 | 7/1916 | Wijnberg | 252/412 |
| 3,723,308 | 3/1973 | Breck | 210/38 R |
| 3,960,760 | 6/1976 | Sanga et al. | 252/412 |
| 4,122,007 | 10/1978 | Yamamoto et al. | 210/38 R |

FOREIGN PATENT DOCUMENTS

| | | | |
|---|---|---|---|
| 49-78676 | 7/1974 | Japan . | |
| 50-31664 | 3/1975 | Japan . | |
| 51-68967 | 6/1976 | Japan | 210/38 R |
| 52-42431 | 10/1977 | Japan | 252/412 |

Primary Examiner—P. E. Konopka
Attorney, Agent, or Firm—Thomas E. Beall, Jr.

[57] ABSTRACT

A method of regenerating zeolite by heating wherein zeolite having adsorbed ($NH_3$-N) in foul water has sodium hydroxide added thereto, the sodium hydroxide containing $Na^+$ equivalent to $NH_4^+$ adsorbed to the zeolite, water is added until the total quantity of the zeolite is submerged, and the resultant zeolite is heated at 400° C. for 30 minutes, whereby a regeneration rate of 90% is attained.

32 Claims, 8 Drawing Figures

AQUEOUS ALKALI OR ALKALINE TREAT AND HEAT REGENERATION OF NH₄⁺ ADSORBED ZEOLITE OR ZEOLITE-CARBON USED TO TREAT WASTE WATER

BACKGROUND OF THE INVENTION

1. Field of the Invention

This invention relates to a method of regenerating zeolite by heating. More particularly, it relates to a method in which zeolite having adsorbed ($NH_3N$—) in foul water is regenerated by heating.

2. Description of the Prior Art

Heretofore, the activated sludge process and the active carbon adsorption method have been mainly known as methods for disposing of industrial waste water and domestic waste water. With these methods, it is possible to remove organic matter contained in foul water and to turn the foul water into clear water. ($NH_3$—N), however, cannot be removed and is often emitted as it is. Since the $NH_3$—N serves as a supply source of nitrogen for algae, it causes the waste water to become nutritious and destroys the balance of growth of organisms. It becomes the cause of the occurrence of the so-called red tide and causes the death of fish in large quantities, and it becomes the source of offensive odors in rivers, lakes and marshes.

For this reason, the establishment of techniques for removing $NH_3$—N has been strongly desired. At present, there have been realized a variety of processes such as the ammonia stripping process, biological disposals, chemical treatments and adsorptions with zeolite etc.

Among these processes, the method of using zeolite including a natural zeolite such as clinoptilolite, mordenite and chabasite and a synthetic zeolite such as one manufactured by crystallizing the substances of raw materials serving as silica and alumina sources, wherein sewage or waste water containing $NH_3$—N is disposed of to adsorb and remove the $NH_3$—N from within the foul water is an excellent method because it is simple and it exhibits a high rate of removing $NH_3$—N. Further, when organic matter in the drain is simultaneously adsorbed by jointly using the active carbon adsorption, the disposal of the drain becomes more perfect.

In general, zeolite is represented by $Me_{2/n}O \cdot Al_2O_3 \cdot XSiO_2 \cdot YH_2O$ (where Me denotes an alkali metal or an alkaline-earth metal, n denotes the charge of Me, and X and Y denote coefficients respectively). It is crystalline hydrous aluminosilicate of a three-dimensional structure made up of a tetrahedron of ($SiO_4$) and ($AlO_4$). The deficiency of charges caused by ($AlO_4$) is filled up by the alkali metal or the alkaline-earth metal. Since the cations are exchangeable, the zeolite has the cation exchanging capability and selectively adsorbs and removes the cations in water. Among such zeolites, ones called clinoptilolite and mordenite selectively adsorb and remove especially ammonium ions ($NH_4^+$). Therefore, the inexpensive natural zeolites (clinoptilolite, mordenite, etc.) are often employed for the removal of $NH_3$—N in the foul water with the zeolite. As is well known, the active carbon adsorbs and removes especially organic matter into fine pores thereof by the Van der Waals force.

In case where the zeolite or the combination of the zeolite and the active carbon is employed for the removal of $NH_3$—N in foul water, the regeneration of the zeolite after the adsorption becomes a problem. In industry, it is desirable to adopt a cyclic system wherein the adsorbing operation and the operation of regenerating the zeolite having adsorbed $NH_3$—N are repeatedly carried out. An example of a regenerating method with such a cyclic system has heretofore been one wherein zeolite is packed in a packed column as in a pure water-producing equipment or a hard water-softening equipment which employs an ion exchange resin and which is used industrially a liquid to be treated is let to pass through the packed column so as to adsorb and remove $NH_3$—N, and thereafter, an aqueous solution of a hydroxide, carbonate, chloride or the like of an alkali metal or an alkaline-earth metal is let to pass therethrough. In another method as disclosed in the official gazette of Japanese Patent Application Laying-open No. 49-78676 or Japanese Patent Application Laying-open No. 50-31664, zeolite having adsorbed ammoniac nitrogen $NH_3$—N is heated to 400°–600° C., thereby to desorb the $NH_3$—N.

In the above methods for regenerating zeolite, the method wherein the solution of the hydroxide or the like of the alkali metal or the alkaline-earth metal is passed through the zeolite having absorbed $NH_3$—N has the disadvantages that a long time is required for the regeneration and waste fluid containing $NH_3$—N and a high concentration of pollutants is discharged, an after-treatment thereof being necessary. In contrast, the method of regeneration by heating wherein the zeolite having adsorbed $NH_4^+$ is heated to 400°–600° C. to cause the ammonia gas to escape can be said to be an excellent regenerating method because waste fluid at high concentration as described above is not discharged.

According to a study by the inventor, however, the method of regeneration of zeolite by heating involves problems to be stated hereunder. $NH_4^+$ on zeolite as ion-exchanged with cations ($Na^+$, $K^+$, etc.) in the zeolite as indicated in Eq. (1) given below escapes from the zeolite in the form of $NH_3$ gas at temperatures of 250°–300° C. or higher as indicated in Eq. (2). The zeolite after regeneration adsorbs $NH_4^+$ in conformity with Eq. (3). In this case, however, at regenerating temperatures of 500°–600° C. or higher, it has been noted that a reaction of Eq. (4) given below takes place besides the reaction of Eq. (2), so any cation capable of adsorption in exchange for $NH_4^+$ does not exist on the zeolite subjected to regeneration by heating, with the result that the $NH_4^+$ adsorption capacity decreases conspicuously. In the above case, even when a favorable regeneration has been executed, the $NH_4^+$ adsorption capacity of the zeolite lowers after repeating the heating regeneration. This is considered to be attributed to the proceeding of the reaction of Eq. (4).

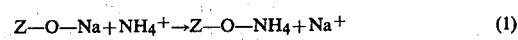

$$Z-O-Na+NH_4^+ \rightarrow Z-O-NH_4+Na^+ \quad (1)$$

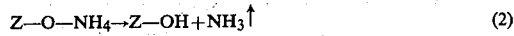

$$Z-O-NH_4 \rightarrow Z-OH+NH_3\uparrow \quad (2)$$

$$Z-O-H+NH_4^+ \rightarrow Z-O-NH_4+H^+ \quad (3)$$

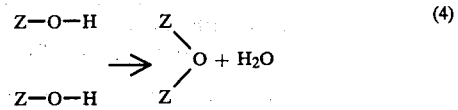

$$\begin{array}{c} Z-O-H \\ Z-O-H \end{array} \rightarrow \begin{array}{c} Z \\ Z \end{array}\!\!\!>\!\!O + H_2O \quad (4)$$

(Z represents the zeolite radical.)

Further, organic matters other than $NH_4^+$ coexist in the general waste water. Although zeolite does not present to the organic matter as high a selective adsorptivity as to $NH_4^+$, it adsorbs them to some extent. When the organic matter is in large quantity, it adheres to zealite surfaces. In case of heating and regenerating the zeolite having adsorbed the $NH_4^+$ and the organic matter, $NH_4^+$ is desorbed as $NH_3$ gas at 250°–300° C. as stated previously. In general, however, the organic matter other than $NH_4^+$ is not sufficiently burnt and desorbed unless heated to 400°–600° C. or above. The organic matter which has not been burnt and desorbed from the zeolite fills up the pores of the zeolite functioning for the adsorption of $NH_4^+$ and degrades the $NH_4^+$ adsorption capacity, so that the regeneration by heating of the zeolite must be generally carried out at about 400°–600° C. At such high temperatures, however, the lowering of the $NH_4^+$ adsorption capacity of the zeolite is inevitable. In particular, there is the problem that the lowering of performance at the repeated regenerations becomes conspicuous.

The foregoing removal of ($NH_3$—N) with zeolite is employed as the method for treating industrial waste water and domestic waste water. Accordingly, the foregoing method of active carbon adsorption is often used jointly in order to remove organic matter. In this case, the zeolite adsorbs cations in the water, especially ammonium ions, while the active carbon absorbs (physical adsorption) and removes especially the organic matter into its fine pores according to the Van der Waals force.

In the above case where the organic matter and $NH_3$—N in the drain are absorbed and removed by jointly using the active carbon and the zeolite, it is desirable from the economical viewpoint to adopt a cyclic system wherein the adsorbing operation and the desorbing and regenerating operation are repeatedly conducted.

In the case of removing the organic matter and $NH_3$—N in the drain by jointly using the active carbon and the zeolite, the active carbon and the zeolite can be simultaneously regenerated, the simultaneous regeneration will become possible as well as the simultaneous removal of the organic matter and $NH_3$—N without separating the mixture into the active carbon and the zeolite. This is convenient in achieving the enhancement of the treating efficiency, the compaction of a treating equipment, etc.

The regeneration by heating of the active carbon needs to be done at or above 400° C., preferably at 600°–800° C., in order to carbonize and decompose the adsorbed organic matter and to sufficiently regenerate the active carbon. On the other hand, the reg eneration temperature of the zeolite is 300°–600° C., preferably 400° C. or below, and when 600° C. is exceeded, the ion exchange site of the zeolite collapses and the $NH_3$—N adsorptivity after the regeneration lowers conspicuously. Further, even in case of regeneration at or below 400° C., the $NH_3$—N adsorptivity is gradually lowered by repeatedly executing the regenerations. Without any contrivance, therefore, the simultaneous regeneration by heating of the active carbon and the zeolite is impossible, and the active carbon and the zeolite cannot but be separated and regenerated individually.

SUMMARY OF THE INVENTION

Objects of the Invention

An object of this invention is to provide a method of regeneration of zeolite by heating which is free from the disadvantages of the prior art and in which zeolite having adsorbed $NH_4^+$ can be regenerated by heating without decreasing the adsorption capacity as far as possible.

Another object of this invention is to provide a method of regeneration of zeolite by heating in which, in order to permit the simultaneous regeneration by heating of active carbon having adsorbed organic matter and the regenerating by heating of zeolite having adsorbed $NH_3$—N, the $NH_3$—N adsorptivity is not lowered even by repeated regenerations at 600°–800° C.

Statement of the Invention

In order to accomplish the first-mentioned object, this invention consists of a method wherein zeolite having adsorbed ($NH_3$—N) in foul water is heated and regenerated in an aqueous solution, characterized in that the heating regeneration is carried out in the presence of ions of at least one metal selected from the g roup consisting of alkali metals and alkaline-earth metals.

In this invention, ions of sodium, potassium, calcium, mag nesium etc. are mentioned as the ions of the alkali metals or alkaline-earth metals. Among them, the ions of sodium, potassium, calcium and magnesium are preferably employed, and especially the sodium ions are the most preferable.

As radical for the compound containing the cations to be added at the regeneration by heating, there are mentioned various ones including hydroxides, carbonates, bicarbonates, chlorides, etc. Particularly preferable are hydroxides, carbonates, bicarbonates etc. which do not produce any harmful gas during thermodecomposition. The metallic compound or compounds is/are held in contact with the zeolite in an aqueous solution during regenerating by heating. In order to uniformly and quickly adsorb the coexistent cations onto the zeolite in exchange after desorbing $NH_3$ gas, the quantity of an aqueous solution containing the cations should preferably be to such an extent that the whole zeolite is submerged.

The heating temperature for regenerating the zeolite in this invention lies, in general, in a range from 100° to 800° C. For example, a regenerating rate of above 70% of the adsorption capacity of zeolite can be attained in this temperature range.

Further, this invention is also applied to a case of mixing zeolite and active carbon as an adsorbent. Also in this case, regeneration by heating is carried out in the presence within the mixture, of ions of at least one metal selected from the group consisting of alkali metals and alkaline-earth metals.

In this invention, sodium and potassium ions are preferable as the alkali metal ions to coexist in the mixture consisting of the zeolite and the active carbon after the adsorptions, and calcium and magnesium ions are preferable as the alkaline-earth metal ions. Among these cations, monovalent cations such as sodium ions are particularly preferable. As radicals for the cations to be added at the heating reproduction, there are mentioned hydroxides, carbonates, bicarbonates, chlorides, etc. of the above-mentioned metals. Preferably employed are hydroxides, carbonates, bicarbonates etc. which do not generate any harmful gas in the thermodecomposition at the regeneration. Regarding the quantity of the cations to coexist, an amount equivalent to the quantity of ammonium ions adsorbed on the zeolite, preferably 1–1.5 equivalents suitable. When the mixture is heated to, for example, about 600° C. in the presence of the cations in excess, the adsorption capacity for the ammonium ions tends to lower due to the collapse of the crystalline structure of the zeolite. The cations are generally added in the form of a solution. Herein, in order to uniformly and quickly adsorb the coexistent cations onto the zeolite in exchange after desorbing the ammonium ions from the zeolite, the quantity of the solution containing the cations should preferably be to such an extent that the whole zeolite is submerged.

The regeneration temperature in this invention is usually appropriate in a range of 400°–800° C. though it depends also on the property of the adsorbent. The regeneration by heating can be executed under the normal pressure, a reduced pressure, or an increased pressure. Regarding the treating period of time, a satisfactory regeneration rate can be usually attained in several tens of minutes.

DESCRIPTION OF THE PREFERRED EMBODIMENTS

Hereunder, this invention will be described more in detail in connection with reference examples and embodiments.

Reference Example 1

Zeolite having adsorbed 0.009 g of ammonium ions ($NH_4^+$) per gram of zeolite (equilibrium $NH_4^+$ concentration: 30 ppm.) was heated at 200° C. in the air for 30 minutes. Thereafter, the $NH_4^+$ adsorption capacity of the zeolite was measured. It was 0.0035 g - $NH_4^+$ per gram of the zeolite, so that the regeneration rate was 39%. Reference Example 2:

Under the same conditions as in Reference Example 1 except that the heating temperature was 400° C., the $NH_4^+$ adsorption capacity of regenerated zeolite was measured. It was 0.0074 g - $NH_4^+$ per gram of the zeolite, so that the regeneration rate was 82%.

Reference Example 3

Under the same conditions as in Reference Example 1 except that the heating temperature was made 600° C., the $NH_4^+$ adsorption capacity of regenerated zeolite was measured. It was 0.0057 g - $NH_4^+$ per gram of the zeolite, so that the regeneration rate was 63%.

Reference Example 4

Under the same conditions as in Reference Example 1 except that the heating temperature was 800° C., the $NH_4^+$ adsorption capacity of regenerated zeolite was measured. It was 0.0033 g - $NH_4^+$ per gram of the zeolite, so that the regeneration rate was 37%.

Reference Example 5

An adsorption at an equilibrium $NH_4^+$ concentration of about 30 ppm. and a regeneration by heating at 600° C. in the air for 30 minutes were repeated 20 times. After 5 regenerations, the $NH_4^+$ adsorption capacity of zeolite was 0.0026 g - $NH_4^+$ per gram of the zeolite, and the regeneration rate was 28.9% (the quantity of the first adsorption was 0.009 g - $NH_4^+$ per gram of the zeolite, and this applies to the following). After 10 regenerations, the $NH_4^+$ adsorption capacity was 0.0023 g - $NH_4^+$ per gram of the zeolite, and the regeneration rate was 26%. After 20 regenerations, the $NH_4^+$ adsorption capacity was 0.001 g - $NH_4^+$ per gram of the zeolite, and the regeneration rate was 11%.

Figure 1:
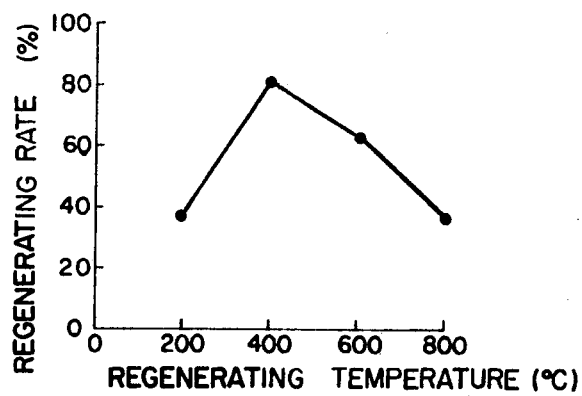
FIG. 1 is a graph showing the relationship between the regeneration temperature and the regeneration rate of zeolite in the prior art.
Figure 2:
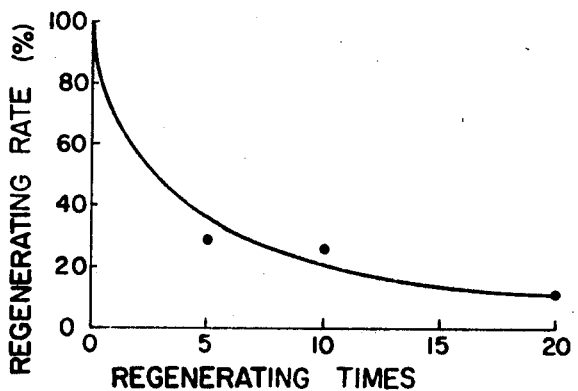
FIG. 2 is a graph showing the relationship between the times of regeneration by heating and the regeneration rate of zeolite in the prior art.

The results of the foregoing reference examples 1–4 are illustrated in FIG. 1, while the results of the reference example 5 are illustrated in FIG. 2.

As apparent from FIG. 1, a temperature of at least 250°14 300° C. is required in the regeneration by heating of the zeolite having adsorbed $NH_4^+$. On the other hand, the $NH_4^+$ adsorption capacity of the zeolite lowers conspicuously in the regeneration at high temperatures of 600°–800° C. This is interpreted as stated below. $NH_4^+$ on the zeolite (Z) as ion-adsorbed to $Na^+$ etc. in the zeolite in conformity with Eq. (1) previously given is desorbed as $NH_3$ gas from the zeolite at 250°–300° C. or above in conformity with Eq. (2), and the zeolite after the regeneration adsorbs $NH_4^+$ again in conformity with Eq. (3) previously given. In addition to these desired reactions, the reaction of Eq. (4) previously given takes place at regeneration temperatures of 500°–600° C. or above, and no cation capable of exchange for $NH_4^+$ exists on the heated and regenerated zeolite, so that the adsorption capacity for $NH_4^+$ will lower conspicuously.

As illustrated in FIG. 2, when the heating regeneration is repeated as in the reference example 5, the $NH_4^+$ adsorption capacity of the zeolite lowers. This is also interpreted to be ascribable to the proceeding of the reaction of Eq. (4) referred to above.

Embodiments of this invention will now be described.

Embodiment 1

0.1 g of sodium hydroxide was added to 5 g of zeolite having adsorbed 0.009 g of $NH_4^+$ per gram of the zeolite ($NH_4^+$ and $Na^+$ were equivalent), and water was added until the total quantity of the zeolite was submerged. After heating the resultant zeolite at 200° C. for 30 minutes, the $NH_4^+$ adsorption quantity of the zeolite was measured. It was 0.0077 g - NH+ per gram of the zeolite, so that the regeneration rate was 86%.

Embodiment 2

Under the same conditions as in Embodiment 1 except that the heating temperature was 400° C., the $NH_4^+$ adsorption capacity of regenerated zeolite was measured. It was 0.008 g - $NH_4^+$ per gram of the zeolite, so that the regeneration rate was 90%.

Embodiment 3

Under the same conditions as in Embodiment 1 except that the heating temperature was 600° C., the heating regeneration of zeolite was executed. When the $NH_4^+$ adsorption capacity of the zeolite was measured, it was 0.0083 g - $NH_4^+$ per gram of the zeolite, so that the regeneration rate was 92%.

Embodiment 4

Under the same conditions as in Embodiment 1 except that the heating temperature was 800° C., zeolite was heated and regenerated. When the $NH_4^+$ adsorption capacity of the zeolite was measured, it was 0.0072 g - $NH_4^+$ per gram of the zeolite, so that the regeneration rate was 80%.

Figure 3:
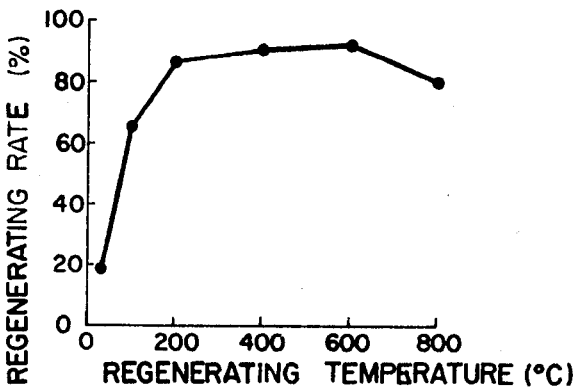
FIG. 3 is a graph showing the relationship between the regeneration temperature and the regeneration rate of zeolite in the case of adding sodium hydroxide.

The results of the foregoing embodiments 1-4 are illustrated in FIG. 3, together with results obtained by making the heating temperatures 30° C. (normal temperature) and 100° C.

Embodiment 5

0.1 g of sodium hydroxide ($Na^+/NH_4^+ = 1$), 0.14 g of potassium hydroxide ($K^+/NH_4^+ = 1$) and 0.18 g of calcium chloride ($Ca^{++}/NH_4^+ = 1$) were respectively added to 5 g of zeolite having adsorbed 0.009 g of $NH_4^+$ per gram of the zeolite. Water was added to the zeolite samples until all of the zeolite samples were submerged. After heating the zeolite samples at 600° C. for 30 minutes, the zeolite samples were caused to adsorb $NH_4^+$ again. The $NH_4^+$ adsorption capacities of the zeolite samples after repeating such operations 10 times were measured. They were 0.0078 g - $NH_4^+$ per gram of the zeolite regeneration rate: 87%), 0.0068 g - $NH_4^+$ per gram of the zeolite (regeneration rate: 76%) and 0.0042 g - $NH_4^+$ per gram of the zeolite (regeneration rate: 47%), respectively.

Embodiment 6

0.05 g ($Na^+/NH_4^+ = 0.5$) of sodium hydroxide, 0.1 g ($Na^+/NH_4^+ = 1$), 0.15 g ($Na^+/NH_4^+ = 1.5$) and 0.2 g ($Na^+/NH_4^+ = 2$) were respectively added to 5 g of zeolite having adsorbed 0.009 g of $NH_4^+$ per gram of the zeolite. Thereafter, the heating regeneration at 600° C. for 30 minutes was repeated 10 times. Then, the $NH_4^+$ adsorption capacities of the zeolite samples were 0.0042 g - $NH_4^+$ per gram of the zeolite (regeneration rate: 47%), 0.0078 g - $NH_4^+$ per gram of the zeolite (regeneration rate: 87%), 0.0080 g-$NH_4^+$ per gram of the zeolite (regeneration rate: 89%) and 0.0012 g - $NH_4^+$ per gram of the zeolite (regeneration rate: 13%) as illustrated in FIG. 4, respectively.

Embodiment 7

Figure 5:
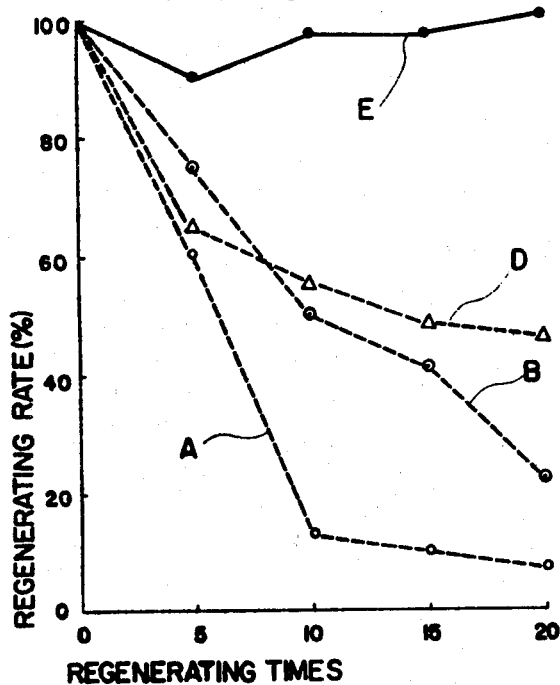
FIG. 5 is a graph showing the relationship between the regeneration times and the regeneration rate in the case where sodium hydroxide, sodium bicarbonate, sodium sulfate, and sodium bicarbonate as well as sodium sulfate were respectively added and where regenerations were repreatedly executed.

An adsorption at an equilibrium $NH_4^+$ concentration of about 30 ppm. and a heating regeneration at 600° C. for 30 minutes after adding 0.2 g of sodium hydroxide ($Na^+/NH_4^+ = 2$), 0.42 g of sodium bicarbonate ($Na^+/NH_4^+ = 2$) or 0.36 g of sodium sulfate ($Na^+/NH_4^+ = 2$) were repeated 20 times. As illustrated in FIG. 5, the $NH_4^+$ adsorption capacities of the zeolite samples at this time were 0.0006 g - $NH_4^+$ per gram of the zeolite (regeneration rate: 7%) in the case of sodium hydroxide A, 0.002 g - $NH_4^+$ per gram of the zeolite (regeneration rate: 22%) in the case of sodium bicarbonate B, and 0.0041 g - $NH_4^+$ per gram of the zeolite (regeneration rate: 46%) in the case of sodium sulfate D.

Figure 4:
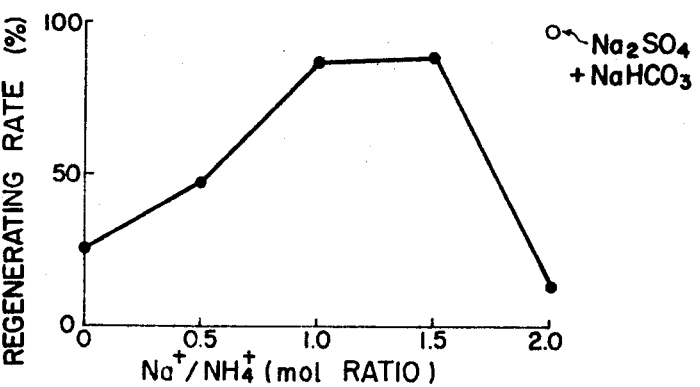
FIG. 4 is a graph showing the relationship between the mol ratio and the regeneration rate in the case where sodium hydroxide was added at different mol ratios and where regeneration was repeated 10 times.

From the above embodiment and FIGS. 4 and 5, it is apparent that the temperature of the regeneration by heating of zeolite having adsorbed $NH_4^+$ in the presence of cations such as $Na^+$, $K^+$ and $Ca^{2+}$ is more effective as it is higher, and that when, e.g., 600° C. is reached, the $NH_4^+$ adsorption capacity of the zeolite is sufficiently recovered, while the lowering of the $NH_4^+$ adsorption capacity attributed to the repeated heating regenerations is remarkably lessened. However, when the heating temperature exceeds 800° C., the $NH_4^+$ adsorption capacity is somewhat degraded. The reason therefor will be that the crystalline structure of the zeolite itself changes due to heat. When the alkali metal or alkaline-earth metal ions coexist, $Na^+$ is more effective than $K^+$ and $Ca^{2+}$. Regarding the quantity of the cations to coexist, the amount equivalent to the quantity of $NH_4^+$ adsorbed on the zeolite is suitable.

As set forth above, the method of regeneration by heating in the presence of the ions of the alkali metal or the alkaline-earth metal is remarkable in the reconvery of the $NH_4^+$ adsorption capacity of the zeolite when compared with the mere regeneration by heating as indicated in the reference examples. In the mere regeneration by heating, after $NH_3$—N has been desorbed from the zeolite by the heating, no cation exchangeable with $NH_4^+$ adsorbs on the zeolite as indicated in Eq. (4) described earlier, so that the $NH_4^+$ adsorption capacity is conspicuously degraded. In contrast, in the method of regeneration by heating in the presence of the alkali metal or the alkaline-earth metal according to this invention, the coexistent cations are adsorbed onto the zeolite in exchange at the same time as the desorption of $NH_3$-N by the heating, so that the recovery of the $NH_4^+$ adsorption is remarkable. Besides, the reaction of Eq. (4) is suppressed, so that the lowering of the adsorption capacity of the zeolite becomes less.

According to the foregoing embodiments of this invention, in the regeneration by heating of zeolite having adsorbed $NH_4^+$, the lowering of the adsorption of the zeolite due to heating is minimized to facilitate the repeated heating regenerations, and moreover, the allowable temperature range of the heating regeneration can be widened, so that the zeolite can be heated and regenerated at a stable and high regenerating rate.

Regarding the cations which we present, it is as already stated that sodium ions are suitable. This is considered to concern the cation-exchange selectivities of zeolite. The selectivites are $K^+ \gg NH_4^+ > Na^+ \gg Ca^{++} > Mg^{++}$. In the addition of potassium ions, the selectivity is greater than for $NH_4^+$, so that the zeolite will become the Z—O—K type through regeneration and the $NH_4^+$ adsorptivity will lower. Conversely, in the addition of calcium ions, the selectivity is less than for $NH_4^+$, so that the exchange between $NH_4^+$ and $Ca^{++}$ will be difficult to take place and regeneration will not take place sufficiently. On the other hand, in the addition of $Na^+$, the selectivity for $Na^+$ is not considerably different from that for $NH_4^+$, $NH_3$ is desorbed from the zeolite half forcibly by the heating, and the zeolite is easily made the Z—O—Na type and regenerated, so that the zeolite will hold a sufficient $NH_4^+$ exchange adsorptivity. Further, regarding the quantity of $Na^+$ to be added, the amount equivalent to the quantity of $NH_4^+$ adsorbed on the zeolite is suitable. There has been noted the tendency that, when the quantity is small, the regeneration in exchange with $NH_4^+$ is not satisfactorily executed, whereas when the quantity is too large, the $NH_4^+$ adsorption capacity lowers due to the collapse of the crystalline structure of the zeolite. In actuality, however, the $NH_4^+$ concentration in the drain varies, and the $NH_4^+$ adsorption capacity of the zeolite varies accordingly. In this respect, it is very difficult to accurately add $Na^+$ equal to the amount of adsorbed $NH_4^+$ and to regenerate the zeolite by heating. When the quantity of added $Na^+$ is deficient, the regeneration rate lowers apparently. It is therefore inevitable to employ a method in which the regeneration is done by adding $Na^+$ slightly in excess. However, when the heating regeneration is repeated by adding $Na^+$ in the mol ratio $Na^+/NH_4^+=2$ with sodium hydroxide being strongly alkaline, sodium bicarbonate being weakly alkaline or sodium sulfate being neutral as in Embodiment 7, the lowering of regeneration the rate is conspicuous in any case. It has been shown from this result and the X-ray diffraction of the regenerated zeolite that as the alkalinity of the additive is greater, the collapse of the crystalline structure of the zeolite is less during heating the lowering of the $NH_4^+$ adsorption capacity being also less.

More specifically, with the addition of sodium hydroxide which is strongly alkaline, when the zeolite is heated at 600° C. especially in the presence of alkali, the crystalline structure of the zeolite is largely destroyed, and the $NH_4^+$ adsorption capacity is greatly reduced. In contrast, with the addition of sodium bicarbonate which is weakly alkaline, the lowering of the regeneration rate is not so great as with the addition of sodium hydroxide. On the other hand, sodium sulfate consisting of a strong acid and a strong base is neutral, and hence, the lowering of the regeneration rate due to the repeated regenerations is comparatively little. However, $Na^+$ in sodium sulfate is exchanged with $NH_4^+$ on the zeolite and is put into the zeolite regeneration by heating, and hence the acid remains and the zeolite is heated at 600° C. in the presence of the acid, with the result that the crystalline structure of the zeolite collapses gradually and that the $NH_4^+$ adsorption capacity lowers.

Embodiment 8

An adsorption at an equilibrium $NH_4^+$ concentration of approximately 30 ppm. and a heating regeneration at 600° C. for 30 minutes after adding a mixed solution ($NaHCO_3/Na_2SO_4=1$) consisting of sodium bicarbonate and sodium sulfate ($Na^+/NH_4^+=2$) were repeated 20 times. The $NH_4^+$ adsorption capacity of zeolite after such processings was 0.009 g - $NH_4^+$ per gram of the zeolite (regeneration rate: 100%) as shown at E in FIG. 5.

Embodiment 9

An adsorption at an equilibrium $NH_4^+$ concentration of approximately 30 ppm. and a heating regeneration at 600° C. for 30 minutes after adding a mixed solution ($NaHCO_3/NaCl=1$) consisting of sodium bicarbonate and sodium chloride ($Na^+/NH_4^+=2$) were repeated 20 times. The $NH_4^+$ adsorption capacity of zeolite after such processings was 0.0085 g - $NH_4^+$ per gram of the zeolite (regeneration rate: 94%).

Embodiment 10

An adsorption at an equilibrium $NH_4^+$ concentration of approximately 30 ppm. and a heating regeneration at 600° C. for 30 minutes after adding a mixed solution ($NaOH/Na_2SO_4=0.1$) consisting of sodium hydroxide and sodium sulfate ($Na^+/NH_4^+=2$) were repeated 20 times. The $NH_4^+$ adsorption capacity of zeolite after such processings was 0.0075 g - $NH_4^+$ per gram of the zeolite (regeneration rate: 83%).

Embodiment 11

An adsorption at an equilibrium $NH_4^+$ concentration of approximately 30 ppm. and a heating regeneration at 600° C. for 30 minutes after adding a mixed solution ($NaHCO_3/Na_2SO_4=0.5$) consisting of sodium bicarbonate and sodium sulfate ($Na^+/NH_4^+=2$) were repeated 20 times. The $NH_4^+$ adsorption capacity of zeolite after such processings was 0.0072 g - $NH_4^+$ per gram of the zeolite (regeneration rate: 80%).

Embodiment 12

An adsorption at an equilibrium $NH_4^+$ concentration of approximately 30 ppm. and a heating regeneration at 600° C. for 30 minutes after adding a mixed solution ($NaHCO_3/Na_2SO_4=2$) consisting of sodium bicarbonate and sodium sulfate ($Na^+/NH_4^+=2$) were repeated 20 times. The $NH_4^+$ adsorption capacity of zeolite after such processings was 0.0061 g - $NH_4^+$ per gram of the zeolite (regeneration rate: 68%).

As appreciated from the foregoing embodiments 8–12, in the case where a sodium salt whose aqueous solution is alkaline or sodium hydroxide is added to a sodium salt consisting of a strong acid and a strong base to the extent that the pH of the solution becomes weakly alkaline and where the mixed solution is added to zeolite having adsorbed $NH_4^+$ (the added $Na^+$ amounts to double the $NH_4^+$), the neutrality is constant during heating regeneration and the repeated regeneration at high temperatures are carried out favorably. Especially, when sodium bicarbonate which is weakly alkaline (pH: 8.5 or so) is employed as the sodium salt exhibiting the alkalinity, the fluctuation of pH during heating regeneration is little and the lowering of the $NH_4^+$ adsorption capacity of the zeolite after the regeneration is little.

In general, the decomposition temperature of organic matter in drain is 300°–400° C. The heating regeneration temperature of active carbon having adsorbed this organic matter is at least 400° C., preferably 600°–800° C. It is therefore apparent that when the temperature is lower than about 400° C. in the simultaneous heating regeneration of zeolite and active carbon, the active carbon is not satisfactorily regenerated, whereas when it falls within the high-temperature range (600°–800° C.) adequate for the regeneration of the active carbon, the $NH_4^+$ adsorptivity of the zeolite lowers conspicuously, a favorable regeneration being impossible.

The inventors have taken note of the fact that, in the heating reproduction of zeolite having adsorbed $NH_3$—N, the lowering of the $NH_3$—N adsorptivity of the zeolite in the high-temperature regeneration is ascribable to the deficiency of exchangeable cations and the collapse of the crystalline structure, and have experimentally confirmed that, in the heating regeneration of active carbon having adsorbed organic matter, the presence of cations such as sodium ions does not adversely affect the regeneration of the active carbon. They have found out that the simultaneous regeneration of the zeolite and the active carbon can be accomplished in such a way that, in order to fill up the deficiency of the cations, ions of an alkali metal or ions of an alkaline-earth metal are added during the regeneration by heating of the zeolite having adsorbed $NH_3$—N and the active carbon having adsorbed the organic matter.

Hereunder, description will be made of Reference Examples 5-8 in which neither the alkali metal ions nor the alkaline-earth metal ions were added and Embodiments 13-16 in which the ions were added.

Reference Example 5

A mixture which consisted of 5 g of zeolite having adsorbed 0.009 g of $NH_4^+$ per gram of the zeolite and 0.5 g of active carbon having adsorbed 0.11 g of phenol per gram of the carbon was heated at 200° C. under a reduced pressure (50 mmH$_2$O) for 30 minutes. Thereafter, the $NH_4^+$ adsorption capacity of the zeolite and the phenol adsorption capacity of the active carbon were measured. They were 0.0032 g - $NH_4^+$ per gram of the zeolite and 0.018 g-phenol per gram of the carbon, so that the regeneration rates of the zeolite and the active carbon were 36% and 16%, respectively.

Reference Example 6

Under the same conditions as in Reference Example 5 except that the heating temperature was 400° C., a mixture consisting of zeolite and active carbon was heated and regenerated. The $NH_4^+$ adsorption capacity of the zeolite and the phenol adsorption capacity of the active carbon were measured again. They were 0.0072 g - $NH_4^+$ per gram of the zeolite and 0.074 g-phenol per gram of the carbon respectively, so that the regeneration rates of the zeolite and the active carbon were 80% and 67% respectively.

Reference Example 7

Under the same conditions as in Reference Example 5 except that the heating temperature was 600° C., a mixture consisting of zeolite and active carbon was heated and regenerated. The $NH_4^+$ adsorption capacity of the zeolite and the phenol adsorption capacity of the active carbon were measured again. They were 0.0055 g - $NH_4^+$ per gram of the zeolite and 0.108 g-phenol per gram of the carbon respectively, so that the regeneration rates of the zeolite and the active carbon were 61% and 98% respectively.

Reference Example 8

Under the same conditions as in Reference Example 5 except that the heating temperature was 800° C., a mixture consisting of zeolite and active carbon was heated and regenerated. The $NH_4^+$ adsorption capacity of the zeolite and the phenol adsorption capacity of the active carbon were measured again. They were 0.0035 g - $NH_4^+$ per gram of the zeolite and 0.109 g-phenol per gram of the carbon respectively, so that the regeneration rates of the zeolite and the active carbon were 39% and 99% respectively.

Embodiment 13

0.1 g of sodium hydroxide was added to a mixture which consisted of 5 g of zeolite having adsorbed 0.009 g of $NH_4^+$ per gram of the zeolite and 0.5 g of active carbon having adsorbed 0.11 g of phenol per gram of the carbon. Water was added until the total quantity of the mixture consisting of the zeolite and the active carbon was submerged. The resultant solution was heated at 200° C. under a reduced pressure for 30 minutes. Thereafter, the $NH_4^+$ adsorption capacity of the zeolite and the phenol adsorption capacity of the active carbon were measured. They were 0.0077 g - $NH_4^+$ per gram of the zeolite and 0.021 g-phenol per gram of the carbon respectively, so that the regeneration rates of the zeolite and the active carbon were 85% and 19% respectively.

Embodiment 14

Under the same conditions as in Example 13 except that the heating temperature was 400° C., a mixture consisting of zeolite and active carbon was heated and reproduced. The $NH_4^+$ adsorption capacity of the zeolite and the phenol adsorption capacity of the active carbon were measured again. They were 0.0083 g - $NH_4^+$ per gram of the zeolite and 0.078 g-phenol per gram of the active carbon respectively, so that the regeneration rates of the zeolite and the active carbon were 92% and 71% respectively.

Embodiment 15

Under the same conditions as in Embodiment 13 except that the heating temperature was 600° C., a mixture consisting of zeolite and active carbon was heated and regenerated. The $NH_4^+$ adsorption capacity of the zeolite and the phenol adsorption capacity of the active carbon were measured again. They were 0.008 g - $NH_4^+$ per gram of the zeolite and 0.108 g-phenol per gram of the carbon respectively, so that the regeneration rates of the zeolite and the active carbon were 96% and 98% respectively.

Embodiment 16

Under the same conditions as in Embodiment 13 except that the heating temperature was 800° C., a mixture consisting of zeolite and active carbon was heated and reproduced. The $NH_4^+$ adsorption capacity of the zeolite and the phenol adsorption capacity of the active carbon were measured again. They were 0.0081 g - $NH_4^+$ per gram of the zeolite and 0.108 g-phenol per gram of the carbon respectively, so that the regeneration rates of the zeolite and the active carbon were 90% and 98% respectively.

Figure 6:
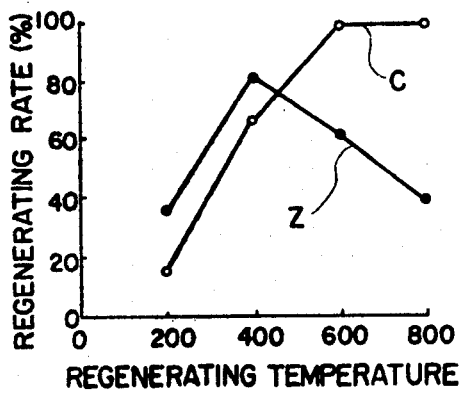
FIG. 6 is a graph showing the relationship between the regeneration temperature and the regeneration rate of a mixture consisting of zeolite and active carbon.
Figure 7:
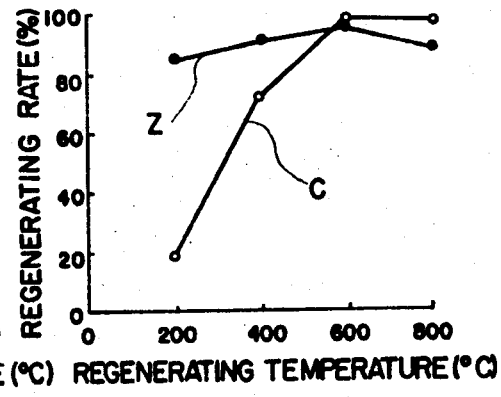
FIG. 7 is a graph showing the relationship between the regeneration temperature and the regeneration rate in the case (an embodiment of this invention) where a mixture consisting of zeolite and active carbon was heated and regenerated in the presence of sodium hydroxide.

The results of the foregoing reference examples 5-8 are illustrated in FIG. 6, while the results of the foregoing embodiments 13-16 are illustrated in FIG. 7. In the figures, letter Z denotes the case of the zeolite, and letter C the case of the active carbon.

As understood from the reference examples, the embodiments and the figures referred to above, when only regeneration by heating of the mixture consisting of the zeolite having adsorbed $NH_4^+$ and the active carbon having adsorbed the organic matter (phenol) (in the reference examples and FIG. 6) is performed, the active carbon is not satisfactorily reduced at a low temperature, whereas the $NH_4^+$ adsorption performance is conspicuously degraded lowered at a high temperature. In contrast, where the cations such as sodium ions are caused to coexist during the heating regeneration of the mixture consisting of the zeolite and the active carbon as in the embodiments 13-16 (in FIG. 7), the lowering of the $NH_4^+$ adsorption performance of the zeolite does not occur even at above 600° C. where a satisfactory regeneration of the active carbon is carried out. Accordingly, the simultaneous heating regeneration of the mixture consisting of the zeolite and the active carbon is executed at high regeneration rates.

Figure 8:
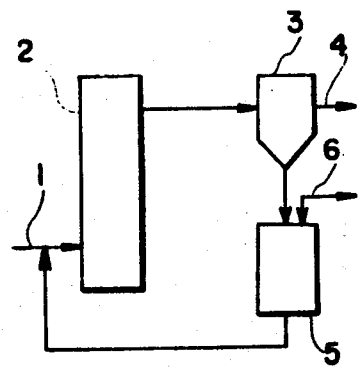
FIG. 8 is a flow sheet showing an example of a drain treating system to which the method of this invention is applied.

FIG. 8 shows an example of a drain treatment system to which the method of this invention is applied. Referring to the figure, drain 1 which contains $NH_3$—N and organic matter comes into contact with a mixture consisting of zeolite and active carbon in a contact column 2. The $NH_3$—N and the organic matter in the drain are respectively adsorbed for removal onto the zeolite and the active carbon, and the drain is purified. On the other hand, the mixture consisting of the zeolite and the active carbon which have adsorbed the $NH_3$—N and the organic matter in the drain respectively is introduced into a separator 3, in which it is dehydrated. Thereafter, it is introduced into a regeneration oven 5. In the regeneration oven, the mixture has cations such as sodium ions added thereto and is heated to a temperature of about 600° C., whereby the simultaneous regeneration of the zeolite and the active carbon is performed. The zeolite and the active carbon thus regenerated are returned to the contact column 2 again and cyclically reused.

According to the above embodiment, the regeneration temperature for the zeolite having adsorbed $NH_3$—N can be raised up to the optimum regeneration temperature for the active carbon, and the mixture consisting of the zeolite and the active carbon can be heated and regenerated together. It is to be understood that the drain treatment system described above applies to a case where the active carbon is not employed.

We claim:

1. A method of regenerating a mixture of zeolite having adsorbed $NH_4^+$ ion and active carbon having adsorbed organic matter, comprising the steps of:
   submerging said mixture in an aqueous solution containing ions of at least one alkali metal thereby adding ions of said at least said one alkali metal to the mixture to make an aqueous mixture, wherein the mol ratio of said alkali ions to said $NH_4^+$ ions is in the range of 1 to 1.5; and
   heating the aqueous mixture with the added ions to within the temperature range of 150° to 800° C. to release $NH_3$ gas and decompose the organic matter without decomposing the zeolite.

2. The method of claim 1, wherein said step of adding adds ions of sodium.

3. The method of claim 1, wherein said step of adding adds ions to potassium.

4. The method of claim 1, wherein said step of heating is carried out within the range of 400° to 800° C.

5. The method of claim 1, wherein said step of adding adds the ions as alkali metal hydroxides.

6. The method of claim 1, wherein said step of adding adds the ions as alkali metal carbonates.

7. The method of claim 1, wherein said step of adding adds the ions as alkali metal bicarbonates.

8. The method of claim 1, wherein said step of adding adds the ions as a solution of a sodium containing salt of a strong acid together with a sodium salt that exhibits alkalinity.

9. The method of claim 1, wherein said step of adding adds the ions as a solution of a sodium containing salt of a strong acid together with sodium hydroxide.

10. A method of regenerating a mixture of zeolite having adsorbed $NH_4^+$ ion and active carbon having adsorbed organic matter, comprisng the steps of:
    submerging said mixture in an aqueous solution containing ions of at least one alkaline earth metal thereby adding ions of said at least one alkaline earth metal to the mixture to make an aqueous mixture, wherein the mol ratio of said alkaline earth metal ions to said $NH_4^+$ ions is in the range of 1 to 1.5, and
    heating the aqueous mixture with the added ions to within the temperature range of 150° to 800° C. to release $NH_3$ gas and decompose the organic matter without decomposing the zeolite.

11. The method of claim 10, wherein said step of adding adds ions of magnesium.

12. The method of claim 10, wherein said step of adding adds ions of calcium.

13. The method of claim 10, wherein said step of heating is carried out within the range of 400° to 800° C.

14. The method of claim 10, wherein said ions are alkaline earth metal hydroxides.

15. The method of claim 10, wherein said ions are alkaline earth metal carbonates.

16. The method of claim 10, wherein said ions are alkaline earth metal bicarbonates.

17. A method of regenerating zeolite having adsorbed $NH_4^+$ ions, comprising the steps of:
    submerging said zeolite in an aqueous solution containing ions of at least one alkali metal thereby adding ions of at least one alkali metal to the zeolite to make an aqueous mixture, wherein the mol ratio of said alkali ions to said $NH_4^+$ ions is in the range of 1 to 1.5; and
    heating the aqueous mixture with the added ions to within the temperature range of 150° to 800° C. to release $NH_3$ gas without decomposing the zeolite.

18. The method of claim 17, wherein said step of adding adds ions of sodium.

19. The method of claim 17, wherein said step of adding adds ions of potassium.

20. The method of claim 17, wherein said step of heating is carried out within the range of 400° to 800° C.

21. The method of claim 17, wherein said step of adding adds the ions as alkali metal hydroxides.

22. The method of claim 17, wherein the step of adding adds the ions as alkali metal carbonates.

23. The method of claim 17, wherein said step of adding adds the ions as alkali metal bicarbonates.

24. The method of claim 17, wherein said step of adding adds the ions as a solution of a sodium containing salt of a strong acid together with a sodium salt that exhibits alkalinity.

25. The method of claim 17, wherein said step of adding adds the ions as a solution of a sodium containing salt of a strong acid together with sodium hydroxide.

26. A method of regenerating zeolite having adsorbed $NH_4^+$ ions, comprising the steps of:
    submerging said zeolite in an aqueous solution containing ions of at least one alkaline earth metal to the zeolite to make an aqueous mixture, wherein the mol ratio of said alkaline earth metal ions to said $NH_4^+$ ions is in the range of 1 to 1.5; and
    heating the aqueous mixture with added ions to within the temperature range of 150° to 800° C. to release $NH_3$ gas without decomposing the zeolite.

27. The method of claim 26, wherein said step of adding adds ions of magnesium.

28. The method of claim 26, wherein said step of adding adds ions of calcium.

29. The method of claim 26, wherein said step of heating is carried out within the range of 400° to 800° C.

30. The method of claim 26, wherein said ions are alkaline earth metal hydroxides.

31. The method of claim 26, wherein said ions are alkaline earth metal carbonates.

32. The method of claim 26, wherein said ions are alkaline earth metal bicarbonates.

* * * * *